(12) United States Patent
Tsuboi et al.

(10) Patent No.: US 10,557,393 B2
(45) Date of Patent: Feb. 11, 2020

(54) POROUS MATERIAL, HONEYCOMB STRUCTURE, AND METHOD OF PRODUCING POROUS MATERIAL

(71) Applicant: NGK Insulators, Ltd., Nagoya-Shi (JP)

(72) Inventors: Mika Tsuboi, Nagoya (JP); Yunie Izumi, Nagoya (JP); Takahiro Tomita, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 111 days.

(21) Appl. No.: 15/782,049

(22) Filed: Oct. 12, 2017

(65) Prior Publication Data

US 2018/0112575 A1 Apr. 26, 2018

(30) Foreign Application Priority Data

Oct. 24, 2016 (JP) ................................. 2016-208153
Mar. 24, 2017 (JP) ................................. 2017-058751
Sep. 7, 2017 (JP) ................................. 2017-172070

(51) Int. Cl.
| | | |
|---|---|---|
| *C04B 38/00* | (2006.01) | |
| *F01N 3/28* | (2006.01) | |
| *B01D 53/94* | (2006.01) | |
| *B01J 35/10* | (2006.01) | |
| *B01J 37/02* | (2006.01) | |
| *C04B 111/00* | (2006.01) | |

(52) U.S. Cl.
CPC ....... *F01N 3/2828* (2013.01); *B01D 53/9418* (2013.01); *B01J 35/1033* (2013.01); *B01J 37/0246* (2013.01); *C04B 38/0074* (2013.01); *B01D 2255/2027* (2013.01); *B01D 2255/2092* (2013.01); *B01D 2255/20707* (2013.01); *B01D 2255/30* (2013.01); *B01D 2255/9205* (2013.01); *C04B 2111/0081* (2013.01); *C04B 2111/00793* (2013.01); *C04B 2235/3201* (2013.01)

(58) Field of Classification Search
CPC .................... B01D 2255/9205; B01D 53/9418
USPC .................................... 428/116, 313.3, 313.9
See application file for complete search history.

(56) References Cited

U.S. PATENT DOCUMENTS

| | | | |
|---|---|---|---|
| 2003/0148063 A1 | 8/2003 | Morimoto et al. | |
| 2005/0143255 A1 | 6/2005 | Morimoto et al. | |
| 2006/0121239 A1* | 6/2006 | Furukawa ............ | B01J 20/2803 428/116 |
| 2007/0026190 A1* | 2/2007 | Baba .................. | B01D 46/0001 428/116 |
| 2008/0057268 A1* | 3/2008 | Lu .......................... | C04B 35/195 428/116 |
| 2010/0086731 A1 | 4/2010 | Noguchi et al. | |

(Continued)

FOREIGN PATENT DOCUMENTS

| | | | |
|---|---|---|---|
| DE | 10 2009 041 585 A1 | 4/2010 | |
| JP | 3359242 B2 * | 12/2002 | ............... B28B 1/24 |

(Continued)

OTHER PUBLICATIONS

U.S. Appl. No. 15/782,064, filed Oct. 12, 2017, Izumi, Yunie.
U.S. Appl. No. 15/782,093, filed Oct. 12, 2017, Izumi, Yunie.
U.S. Appl. No. 15/785,838, filed Oct. 17, 2017, Izumi, Yunie.

*Primary Examiner* — Tri V Nguyen
(74) *Attorney, Agent, or Firm* — Burr & Brown, PLLC

(57) ABSTRACT

A porous material includes aggregate particles, and a binding material that contains cordierite and zircon particles and binds the aggregate particles together in a state where pores are formed.

9 Claims, 5 Drawing Sheets

(56) References Cited

U.S. PATENT DOCUMENTS

| | | | |
|---|---|---|---|
| 2010/0296992 A1* | 11/2010 | Jiang | B01D 53/9418 423/239.2 |
| 2014/0370232 A1 | 12/2014 | Izumi et al. | |
| 2015/0093540 A1* | 4/2015 | Ichikawa | C04B 35/573 428/117 |
| 2015/0265969 A1* | 9/2015 | Fedeyko | B01D 53/9418 423/213.2 |

FOREIGN PATENT DOCUMENTS

| | | |
|---|---|---|
| JP | 2003-292388 A1 | 10/2003 |
| JP | 4111439 B2 | 7/2008 |
| JP | 4227347 B2 | 2/2009 |
| WO | 02/070433 A1 | 9/2002 |
| WO | 2013/146953 A1 | 10/2013 |

* cited by examiner

POROUS MATERIAL, HONEYCOMB STRUCTURE, AND METHOD OF PRODUCING POROUS MATERIAL

BACKGROUND OF THE INVENTION

1. Field of the Invention

The present invention relates to a porous material, a honeycomb structure, and a method of producing a porous material.

2. Description of Related Art

Porous materials are conventionally used in applications such as diesel particulate filters (DPF). For example, International Publication No. WO 2002/070433 (Document 1) discloses a technique for forming cell partition walls and a honeycomb outer wall in a honeycomb structure by using a material that contains silicon carbide (SiC) as an aggregate and cordierite as a binding material. Japanese Patent Application Laid-Open No. 2003-292388 (Document 2) discloses a porous material composed of silicon carbide and cordierite and having a porosity of 52 to 70%, an average pore diameter of 15 to 30 μm, and a bending strength greater than or equal to 7 MPa. International Publication No. WO 2013/146953 (Document 3) discloses a technique for obtaining a porous material with high thermal shock resistance by dispersing mullite particles that serve as reinforcing particles in cordierite that serves as a binding material.

Incidentally, DPFs or other devices require the porous materials to have higher porosity in order to reduce pressure loss. However, an increase in porosity reduces the mechanical strength of the porous materials.

SUMMARY OF THE INVENTION

The present invention is intended for a porous material, and it is an object of the present invention to increase the mechanical strength of the porous material.

A porous material according to the present invention includes aggregate particles, and a binding material that contains cordierite and zircon particles and binds the aggregate particles together in a state where pores are formed.

According to the present invention, it is possible to increase the mechanical strength of the porous material.

In a preferred embodiment of the present invention, the ratio of the mass of the binding material to the total mass of the aggregate particles and the binding material is greater than or equal to 8 mass % and less than or equal to 40 mass %.

In another preferred embodiment of the present invention, the ratio of the mass of the zircon particles to the mass of the binding material is greater than or equal to 1 mass % and less than or equal to 50 mass %.

In another preferred embodiment of the present invention, a major axis of the zircon particles is greater than or equal to 2.0 μm.

The porosity of the porous material is, for example, higher than or equal to 50% and lower than or equal to 70%.

The bending strength of the porous material is preferably greater than or equal to 7.5 MPa.

In another preferred embodiment of the present invention, the ratio of the mass of sodium to the mass of the porous material as a whole is less than 0.1 mass %. A representative value for an angle at which an edge of the binding material in a cross-section of the porous material rises with respect to a direction tangent to the edge at a position at which curvature is locally a maximum is preferably greater than 0 degrees and less than or equal to 25 degrees.

The present invention is also intended for a honeycomb structure. The honeycomb structure according to the present invention is a tubular member made of the porous material described above and having an interior partitioned into a plurality of cells by partition walls.

The present invention is also intended for a method of producing a porous material. The method of producing a porous material according to the present invention includes a) obtaining a compact by molding a mixture of an aggregate raw material, a raw material of binding material, and a pore forming material, and b) obtaining a porous material by firing the compact, the porous material being a fired compact. The porous material contains cordierite and zircon particles as a binding material.

Preferably, the raw material of binding material contains zirconia particles, and the zircon particles are generated by firing in the operation b).

More preferably, the zirconia particles have a particle diameter greater than or equal to 0.4 μm and less than or equal to 10 μm.

The firing temperature in the operation b) is preferably higher than or equal to 1430° C.

These and other objects, features, aspects and advantages of the present invention will become more apparent from the following detailed description of the present invention when taken in conjunction with the accompanying drawings.

DETAILED DESCRIPTION OF THE INVENTION

Figure 1:
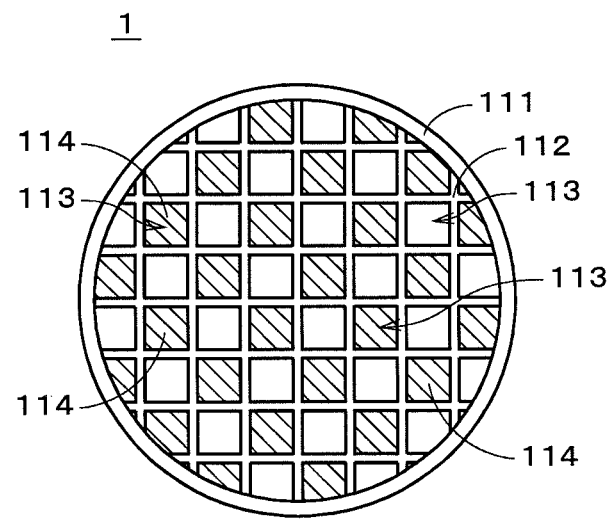
FIG. 1 illustrates a honeycomb structure.
Figure 2:
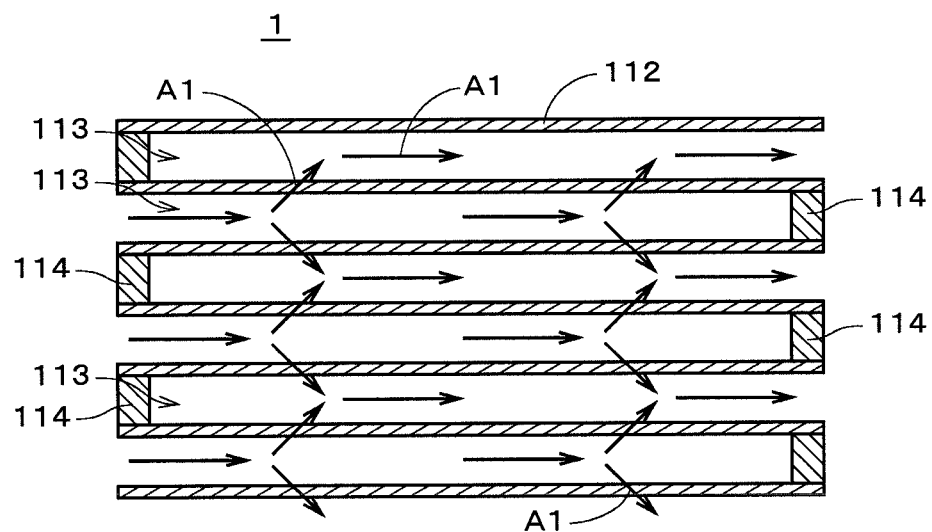
FIG. 2 is a sectional view of the honeycomb structure.

FIG. 1 is a simplified diagram of a honeycomb structure 1 according to an embodiment of the present invention. The honeycomb structure 1 is a tubular member that is long in one direction, and FIG. 1 illustrates an end surface on one side in the longitudinal direction of the honeycomb structure 1. FIG. 2 is a sectional view of the honeycomb structure 1 and illustrates part of a section taken along the longitudinal direction. The honeycomb structure 1 is used for, for example, filters such as DPFs. The honeycomb structure 1 may also be used in different applications other than filters.

The honeycomb structure 1 includes a tubular outer wall 111 and partition walls 112. The tubular outer wall 111 and the partition walls 112 are formed of a porous material, which will be described alter. The tubular outer wall 111 has a tubular shape extending in the longitudinal direction. A cross-sectional shape of the tubular outer wall 111 perpendicular to the longitudinal direction is, for example, a circular shape, or may be other shapes such as polygonal shapes. The partition walls 112 are provided in the interior of the tubular outer wall 111 and partition the interior into a plurality of cells 113. The thickness of the partition walls 112 is, for example, greater than or equal to 30 micrometers (μm), and preferably greater than or equal to 50 μm. The thickness of the partition walls 112 is also, for example, less than or equal to 1000 μm, preferably less than or equal to 500 μm, and more preferably less than or equal to 350 μm.

Each cell 113 forms a space extending in the longitudinal direction. A cross-sectional shape of the cell 113 perpendicular to the longitudinal direction is, for example, a polygonal shape (e.g., triangular, quadrangular, pentagonal, or hexagonal shape), or may be other shapes such as a circular shape. The plurality of cells 113 have, in principle, the same cross-sectional shape. Alternatively, the plurality of cells 113 may include cells 113 having different cross-sectional shapes. The density of the cells is, for example, greater than or equal to 10 cells per square centimeter (/cm$^2$), preferably greater than or equal to 20 cells/cm$^2$, and more preferably greater than or equal to 50 cells/cm$^2$. The density of the cells is also, for example, less than or equal to 200 cells/cm$^2$, and preferably less than or equal to 150 cells/cm$^2$.

When the honeycomb structure 1 is used as a DPF, a predetermined gas flows from one end in the longitudinal direction of the honeycomb structure 1 as an inlet to the other end as an outlet. A predetermined number of cells 113 each have a sealing part 114 at the inlet-side end, and the remaining cells 113 each have a sealing part 114 at the outlet-side end. Thus, the gas flowing into the honeycomb structure 1 flows from the cells 113 whose inlets are not sealed through the partition walls 112 to the cells 113 whose outlets are not sealed (see the arrows A1 in FIG. 2). At this time, particles in the gas are efficiently collected by the partition walls 112. Preferably, at each of the inlet- and outlet-side ends of the honeycomb structure 1, the sealing parts 114 are alternatively provided in the directions of the arrangement of the cells 113. In the honeycomb structure 1, a catalyst is supported as necessary.

Figure 3:
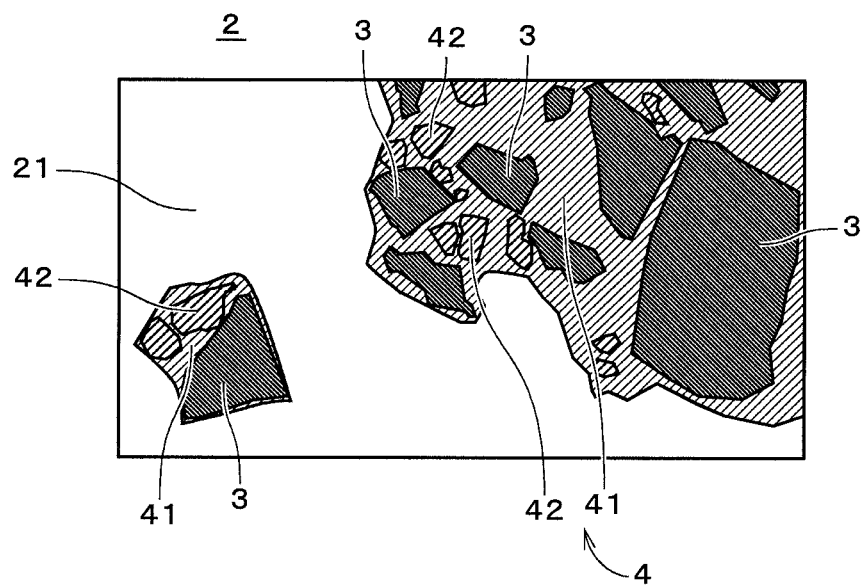
FIG. 3 illustrates a structure of a porous material.

FIG. 3 illustrates a structure of a porous material 2 that forms the honeycomb structure 1. The porous material 2 is a porous sintered compact and includes aggregate particles 3 and a binding material 4. The binding material 4 binds the aggregate particles 3 together in a state where pores 21 are formed. The binding material 4 includes cordierite 41 and zircon (ZrSiO$_4$) particles 42. In the porous material 2, substances other than the aggregate particles 3 are assumed to be, in principle, included in the binding material 4.

The aggregate particles 3 include particle bodies. The particle bodies are typically composed of one kind of substance. The particle bodies are, for example, silicon carbide (SiC) particles. Instead of silicon carbide, the substance composing the particle bodies may, for example, be silicon nitride (Si$_3$N$_4$), aluminum nitride (AlN), titanium carbide (TiC), titanium nitride (TiN), mullite (Al$_6$Si$_2$O$_{13}$), alumina (Al$_2$O$_3$), aluminum titanate (Al$_2$TiO$_5$), magnesium titanate (MgTi$_2$O$_5$), or zircon. In the present embodiment, the particle bodies of the aggregate particles 3 are formed of a substance other than zircon. For example, the particle bodies of the aggregate particles 3 are particles of the most abundant substance among substances that compose the porous material 2. When a non-oxide material is used for the particle bodies, the aggregate particles 3 may include oxide films provided on or around surfaces of the particle bodies. Preferably, each aggregate particle 3 is composed of a particle body, or composed of a particle body and an oxide film. The oxide films as used herein refer to oxide layers formed on the surfaces of the particle bodies through heat treatment in an oxidizing atmosphere when a non-oxide material is used for the particle bodies. When the particle bodies of the aggregate particles 3 are SiC or Si$_3$N$_4$ particles, it is preferable for the aggregate particles 3 to include the oxide films described above. The oxide films preferably contain a cristobalite phase and preferably contain SiO$_2$. For example, when the porous material 2 is used as a catalyst carrier for purifying vehicle emission, the presence of the oxide films around the particle bodies helps obtain excellent oxidation resistance. The ratio of the mass of aggregate particles 3 to the total mass of the aggregate particles 3 and the binding material 4 is greater than or equal to 50 mass %. In other words, the ratio of the mass of the binding material 4 to the total mass of the aggregate particles 3 and the binding material 4 is less than or equal to 50 mass %.

The ratio of the mass of each constituent crystalline phase (aggregate particles 3, cordierite 41, and zircon particles 42) in the porous material 2 can be calculated by, for example, simple quantitative analysis. In the simple quantitative analysis, each component is determined quantitatively by analyzing X-ray diffraction data, using the reference intensity ratio (RIR) method. For the analysis of the X-ray diffraction data, MDI Jade 7 software, which is X-ray data analysis software, may be used. One exemplary X-ray diffractometer used in the X-ray diffraction analysis is a rotating anticathode X-ray diffractometer (RINT manufactured by Rigaku Corporation).

The porous material 2 used for the honeycomb structure 1 is required to have high porosity (here, open porosity) and high mechanical strength. In order for the porous material 2 to easily achieve high porosity, the average particle diameter of the aggregate particles 3 is preferably greater than or equal to 5 μm, and more preferably greater than or equal to 10 μm. In order to avoid the presence of many excessively large pores 21 in the porous material 2, the average particle diameter of the aggregate particles 3 is preferably less than or equal to 100 μm, and more preferably less than or equal to 40 μm. The average particle diameter of the aggregate particles 3 is typically greater than the average particle diameter of the zircon particles 42 in the binding material 4. The average particle diameter of the aggregate particles 3 is, for example, 1.5 times or more and 40 times or less the average particle diameter of the zircon particles 42. The average particle diameter can be measured by a laser diffraction method (the same applies hereinafter).

The ratio of the mass of the binding material 4 to the total mass of the aggregate particles 3 and the binding material 4 is preferably greater than or equal to 8 mass % and less than or equal to 40 mass %. When the ratio of the binding material 4 in the porous material 2 is greater than or equal to 8 mass %, the porous material 2 can ensure a certain level of mechanical strength. In the specification, the mechanical strength means bending strength. In order to further increase the mechanical strength of the porous material 2, the ratio of the binding material 4 in the porous material 2 is preferably greater than or equal to 10 mass %, and more preferably greater than or equal to 12 mass %. If the ratio of the binding material 4 in the porous material 2 exceeds 40 mass %, the porous material 2 will have more difficulty in achieving high porosity. In order for the porous material 2 to easily achieve high porosity, the ratio of the binding material 4 in the porous material 2 is preferably less than or equal to 30 mass %, and more preferably less than or equal to 20 mass %.

In the binding material 4, the cordierite 41 contains the zircon particles 42. The zircon particles 42 exist in a dispersed state in the cordierite 41. The zircon particles 42 and the cordierite 41 are bound to each other. Typically, each zircon particle 42 exists while being surrounded by the cordierite 41. For example, when cracking has occurred in the binding material 4, the zircon particles 42 prevent further development of the cracking. Thus, the mechanical strength of the porous material 2 increases. The zircon particles 42 can also be regarded as reinforcing particles that increase the mechanical strength of the porous material 2. The thermal expansion coefficient of the zircon particles 42 is closely analogous to the thermal expansion coefficient of the cordierite 41. This reduces the occurrence of cracking due to temperature change at the interfaces between the cordierite 41 and the zircon particles 42. By suppressing the development and occurrence of cracking, the thermal shock resistance of the porous material 2 also increases.

In the porous material described in International Publication No. WO 2013/146953 (Document 3 described above), mullite particles are dispersed in the binding material. On the other hand, the zircon particles 42 contained in the binding material 4 of the porous material 2 in FIG. 3 have higher mechanical strength than mullite particles. Thus, it is easy to make the mechanical strength of the porous material 2 higher than the mechanical strength of porous materials that contain mullite particles. A difference in thermal expansion coefficient between the zircon particles 42 and the cordierite 41 is smaller than a difference in thermal expansion coefficient between mullite particles and cordierite. Thus, the porous material 2 in FIG. 3 can also reduce the occurrence of cracking due to temperature change, as compared with porous materials containing mullite particles.

The ratio of the mass of the zircon particles 42 to the mass of the binding material 4 is preferably greater than or equal to 1 mass % and less than or equal to 50 mass %. When the ratio of the zircon particles 42 in the binding material 4 is greater than or equal to 1 mass %, the porous material 2 can ensure a certain level of mechanical strength. In order to further increase the mechanical strength of the porous material 2, the ratio of the zircon particles 42 in the binding material 4 is preferably greater than or equal to 3 mass %, and more preferably greater than or equal to 5 mass %. If the ratio of the zircon particles 42 in the binding material 4 exceeds 50 mass %, the amount of the cordierite 41 that affects the bonding between the aggregate particles 3 decreases, and consequently the mechanical strength of the porous material 2 may decrease. In order for the porous material 2 to more reliably ensure a certain level of mechanical strength, the ratio of the zircon particles 42 in the binding material 4 is preferably less than or equal to 40 mass %, and more preferably less than or equal to 35 mass %. In one example of the porous material 2, the ratio of the zircon particles 42 in the binding material 4 is less than or equal to 30 mass %.

The major axis of the zircon particles 42 is preferably greater than or equal to 1.0 μm. Here, the major axis of the zircon particles 42 is an average value of maximum lengths of the zircon particles 42 in a given cross-section of the porous material 2, and can be regarded as an index of the size of the zircon particles 42. When the major axis of the zircon particles 42 is greater than or equal to 1.0 μm, the mechanical strength of the porous material 2 can be increased more reliably. In order to further increase the mechanical strength of the porous material 2, the major axis of the zircon particles 42 is preferably greater than or equal to 2.0 μm, and more preferably greater than or equal to 2.5 μm. The major axis of the zircon particles 42 is also preferably less than or equal to 10.0 μm, and more preferably less than or equal to 6.0 μm. If the major axis of the zircon particles 42 exceeds 10.0 μm, coarse defects may appear and reduce the mechanical strength of the porous material 2. In the measurement of the major axis of the zircon particles 42, for example, a mirror-polished cross-section of the porous material 2 is photographed at a magnification of 6000 times with a scanning electron microscope (SEM). Then, a maximum length of each zircon particle 42 is obtained in the photograph, and an average value (or median value) of the maximum lengths of a plurality of zircon particles 42 is acquired as the major axis of the zircon particles 42.

The binding material 4 may contain a crystalline component and an amorphous component. The binding material 4 preferably contains 50 mass % or more of the crystalline component. That is, the binding material 4 preferably contains less than 50 mass % of the amorphous component. The amorphous component in the binding material 4 can be determined quantitatively by analyzing X-ray diffraction data. More specifically, when a maximum height of the background in the range of $2\theta$ from 20° to 30° is 25% with respect to a diffraction peak height in the (100) plane of hexagonal crystal cordierite, the amorphous amount in the whole binding material 4 is assumed to be 50 mass %. When the maximum height of the background in the range of $2\theta$ from 20° to 30° is 2.8% with respect to the diffraction peak height in the (100) plane of hexagonal crystal cordierite, the amorphous amount in the whole binding material 4 is assumed to be 0 mass %. Then, the measurement results for samples are applied to the relationship (calibration curve) described above so as to obtain the amorphous amount in the binding material 4. The measurement can be conducted using powder obtained by pulverizing the porous material 2 as a measurement sample and using a rotating anticathode X-ray diffractometer (RINT manufactured by Rigaku Corporation).

In a typical example of the porous material 2, surfaces at the three-phase interfaces of the aggregate particles 3, the binding material 4, and the pores 21 are formed in a "smoothly bound" state. Here, the "smoothly bound" surfaces at the three-phase interfaces refer to a state in which the binding material 4 that binds the aggregate particles 3 together extends either smoothly or in a gentle curve (or along a curved surface) from the vicinity of a three-phase interface of one aggregate particle 3, the binding material 4, and a pore 21 in a direction toward another aggregate particle 3. In FIG. 3, the porous material 2 is schematically illustrated, and the "smoothly bound" state of the surfaces at the three-phase interfaces is not clear.

In the porous material 2 according to the present embodiment, the "three-phase interfaces" are, strictly speaking, limited to areas where the aggregate particles 3, the binding material 4, and the pores 21 intersect with one another, but in the specification, they are assumed to also include areas where the surfaces of the aggregate particles 3 are lightly covered with the binding material 4 and are in close proximity to the pores 21.

In the case of the porous material 2 according to the present embodiment, assuming that the aggregate particles 3 are solid and at least part of the binding material 4 is in a liquid state during firing at high temperature, the liquid binding material 4 adheres with a small contact angle to the surfaces (solid-phase surfaces) of the solid aggregate particles 3, and this condition is maintained until the completion of firing and cooling so as to obtain the microstructure as described.

In this way, some (or most) of the aggregate particles 3 are covered with the binding material 4. As a result, angular edge portions of the aggregate particles 3 are covered with the binding material 4, and somewhat rounded shapes appear as a whole. The pores 21 in contact with these aggregate particles 3 and the binding material 4 also have rounded edge shapes. Such a structure that includes many curved portions at, in particular, the three-phase interfaces of the aggregate particles 3, the binding material 4, and the pores 21 is expressed as the "smoothly bound" state in the specification.

Figure 4:
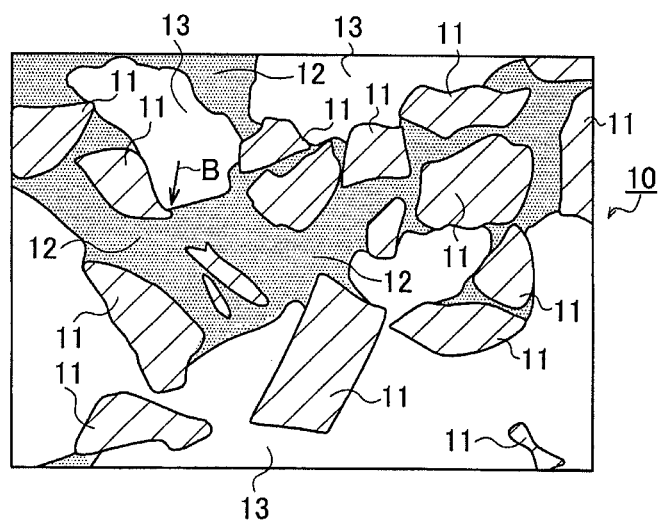
FIG. 4 illustrates a structure of a porous material according to a comparative example.

FIG. 4 schematically illustrates a structure of a porous material 10 according to a comparative example. The porous material 10 according to the comparative example differs from the porous material 2 in FIG. 3 in that its binding material 12 does not contain a zirconium component (zircon particles). In the case of a cross-sectional microstructure of the porous material 10 according to the comparative example, angular aggregate particles 11 with linear sharp edges are observed just as they are, and the binding material 12 that binds the aggregate particles 11 together extends in a linear shape in the vicinity of a three-phase interface B (see the arrow in FIG. 4) of one aggregate particle 11, the binding material 12, and a pore 13 toward another aggregate particle 11. Thus, this is not a "smoothly bound" state as defined above. Moreover, most (e.g., 50% or more) of the surfaces of the aggregate particles 11 is in contact with the pores 13, and this is different from the porous material 2 according to the present embodiment in which most (e.g., 50% or more) of the surfaces of the aggregate particles 3 is covered with the binding material 4, and the pores 21 are in contact with the binding material 4.

That is, in the case of the porous material 10 according to the comparative example, the binding material 12 does not have a curved shape in the vicinity of the interfaces with the aggregate particles 11; the aggregate particles 11 and the pores 13 also do not have rounded shapes; and many of them are configured angularly or linearly or in irregular shapes, as compared with the porous material 2 according to the present embodiment. The porous material 2 according to the present embodiment greatly differs in microstructure from the porous material 10 according to the comparative example.

The porous material 2 according to the present embodiment is expected to have smoothly bound three-phase interfaces of the aggregate particles 3, the binding material 4, and the pores 21 and to have a large area of contact between the aggregate particles 3 and the binding material 4. As a result, the bonding force between the aggregate particles 3 and the binding material 4 increases, and this increase in the bonding force at each interface between each aggregate particle 3 and the binding material 4 in the porous material 2 leads to an increase in the strength (mechanical strength) of the porous material 2 as a whole.

As compared with the porous material 10 (see FIG. 4) having a microstructure with sharp edges, the porous material 2 having a "smoothly bound" microstructure can relieve stress concentration applied to edge portions by its curved shape. Accordingly, the strength of the porous material 2 as a whole increases.

Figure 5:
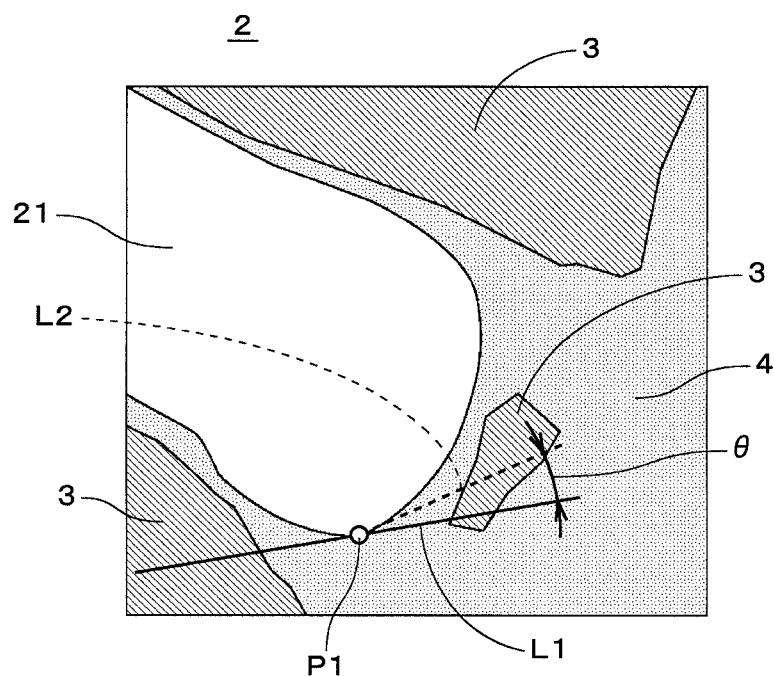
FIG. 5 is a diagram describing a measurement of the angle of rise.

The quantification of the above-described microstructure of the porous material 2 will now be described. In the porous material 2, boundary lines between the binding material 4 and the pores 21 (hereinafter, simply referred to as "edges of the binding material") have rounded shapes as viewed in an image of a mirror-polished cross-section. Thus, in one example of the quantification of the above-described microstructure, the rounding of the edges of the binding material 4 is converted into numbers. More specifically, first, a cross-section obtained by mirror-polishing the porous material 2 contained in a resin is photographed at a magnification of 1500 times with a scanning electron microscope so as to obtain an image that is a reflected electron image. The magnification of the image may be appropriately changed. FIG. 5 illustrates part of this image.

Then, a measurement position P1 on an edge of the binding material 4 is specified in the image. The measurement position P1 is a position at which the curvature is locally a maximum on the edge of the binding material 4. In the above-described microstructure of the porous material 2, an edge of the binding material 4 that binds two aggregate particles 3 together has a concave shape between the vicinity of the three-phase interface with one of the aggregate particles 3 and the vicinity of the three-phase interface with the other aggregate particle 3. Between these three-phase interfaces, typically, the inclination of the edge of the binding material 4 changes continuously and there are few angular portions. One example of the measurement position P1 is a position that has a maximum curvature between these three-phase interfaces on the edge of the binding material 4. In the porous material 10 according to the comparative example, the edges of the binding material 12 do not have rounded shapes, and therefore a top of a recessed portion on an edge of the binding material 12 is specified as a measurement position P1.

Then, a straight line that indicates a direction tangent to the edge of the binding material 4 at the measurement position P1 is set as a reference line L1 as illustrated in FIG. 5. In the vicinity of the measurement position P1, a straight line that rises from the measurement position P1 toward one side along the edge of the binding material 4 is set as a rising line L2. The rising line L2 is, for example, a straight line that connects the measurement position P1 and a position that is spaced toward one side by a predetermined infinitesimal distance (e.g., 1 to 5 µm) from the measurement position P1, on the edge of the binding material 4. Then, the angle formed by the reference line L1 and the rising line L2 is acquired as the angle of rise θ. In this way, the angle of rise θ indicates an angle at which an edge of the binding material 4 in a given cross-section of the porous material 2 rises from the measurement position P1 at which the curvature is locally a maximum, with respect to a direction tangent to the edge at the measurement position P1.

For example, a plurality of angles of rise θ are obtained by specifying a plurality of measurement positions P1, and an average value of these angles is obtained as a representative value for the angle of rise on the edge. With the porous material 2 having the above-described microstructure, the representative value for the angle of rise is typically greater than 0 degrees and less than or equal to 25 degrees. On the other hand, with the porous material 10 according to the comparative example, the representative value for the angle of rise is greater than 25 degrees because the edges of the binding material 12 do not have rounded shapes and tops of recessed portions on edges of the binding material 12 are specified as measurement positions P1. The representative value for the angle of rise may be a median value or other values, instead of the average value. The number of measurement positions P1 to be specified in obtaining the representative value for the angle of rise is preferably larger than or equal to 5 (e.g., smaller than or equal to 100).

In the porous material 2 according to the present embodiment, the above-described microstructure is obtained by including a zirconium component (zircon particles) in the binding material 4, which is used to bind the aggregate particles 3 together. In the porous material 2, the smoothly bound state of the surfaces at the three-phase interfaces of the aggregate particles 3, the binding material 4, and the pores 21 does not necessarily have to be clear. In other words, it can also be expected that the aforementioned smoothly bound state of the surfaces at the three-phase interfaces may be unclear depending on factors such as the ratio of the mass of the binding material 4 in the porous material 2 and the particle diameter of the aggregate particles 3. Even in this case, the porous material 2 that includes the aforementioned zirconium component in the binding material 4 can have improved mechanical strength.

When the porous material 2 contains sodium (Na) as, for example, impurities, the ratio of the mass of sodium to the mass of the whole porous material 2 is preferably less than 0.1 mass % (greater than or equal to 0 mass %). As will be described later, zircon is generated from a zirconia component by firing, and if the ratio of the mass of sodium is greater than or equal to 0.1 mass %, the melting point of a binding material component including the zirconium component will decrease, and an amorphous layer will be easily formed. Thus, it may become difficult to generate zircon as a crystalline material during firing. By setting the amount of sodium to be less than 0.1 mass %, the melting point of the binding material component can be kept appropriate, and zircon as a crystalline material can be easily generated. Setting the amount of sodium to be less than 0.1 mass % also makes it possible to suppress deterioration of NOx purification performance due to high-temperature aging when an SCR catalyst is supported and used by the porous material 2 (honeycomb structure 1). The sodium content can be measured by, for example, inductively coupled plasma atomic emission spectroscopy (ICP-AES).

The porosity of the porous material 2 is, for example, higher than or equal to 40%. This suppresses an excessive increase in pressure loss in the honeycomb structure 1 used as a DPF. As described previously, the porosity in the specification means open porosity. In order to further reduce the pressure loss, the porosity is preferably higher than or equal to 50%, and more preferably higher than or equal to 55%. The porosity is also, for example, lower than or equal to 80%, and this allows the honeycomb structure 1 to ensure a certain level of mechanical strength. In order to further increase the mechanical strength, the porosity is preferably lower than or equal to 70%, and more preferably lower than or equal to 65%. The open porosity can be measured by, for example, the Archimedes method using pure water as a medium. Note that the porosity can be adjusted by changing, for example, the amount of a pore forming material for use in producing porous materials, the amount of a sintering agent, and a firing atmosphere. The porosity can also be adjusted by changing the ratio between the aggregate particles 3 and the binding material 4.

When the porous material 2 (honeycomb structure 1) is used for DPFs or the like, pores 21 with pore diameters less than or equal to 10 μm can easily get clogged when supporting a catalyst. Thus, in the porous material 2, the volume ratio of pores 21 with pore diameters less than or equal to 10 μm is preferably less than 10% of all pores 21. In order to improve the function of filters such as DPFs, the volume ratio of pores 21 with pore diameters greater than or equal to 40 μm that can easily pass particulate matter therethrough is preferably less than 10% of all pores 21.

The bending strength of the porous material 2 is, for example, greater than or equal to 7.5 mega pascals (MPa). This increases the thermal shock resistance of the porous material 2 to a certain level. The bending strength of the porous material 2 is preferably greater than or equal to 10.0 MPa, and more preferably greater than or equal to 12.0 MPa. The upper limit of the bending strength of the porous material 2 is assumed to be approximately 40 MPa. In the specification, the bending strength can be measured by a bending test compliant with JIS R1601.

Figure 6:
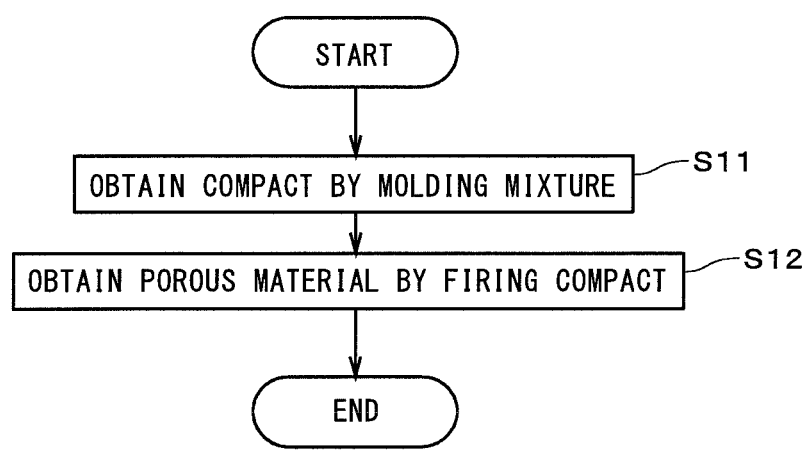
FIG. 6 is a flowchart of processing for producing a porous material.

FIG. 6 is a flowchart of processing for producing the porous material 2. Here, the honeycomb structure 1 is produced as a result of producing the porous material 2. That is, the porous material 2 is produced as the honeycomb structure 1.

First, an aggregate raw material for the aggregate particles 3, a raw material of binding material for use in generating the binding material 4 by firing, and a pore forming material are mixed, and other components such as a binder, a surface-active agent, and water are further added as necessary to prepare a molding raw material. The aggregate raw material preferably contains silicon carbide (SiC) powder. The raw material of binding material contains, for example, a cordierite raw material and zirconia ($ZrO_2$) particles. The cordierite raw material means a raw material for use in generating a cordierite crystal by firing. The cordierite raw material preferably contains an aluminum oxide ($Al_2O_3$) component, a silicon dioxide ($SiO_2$) component, and a magnesium oxide (MgO) component. Assuming that the mass of the aggregate raw material is 100 mass %, the ratio of the binding-material component in the molding raw material is, for example, greater than or equal to 9.0 mass % and less than or equal to 67.0 mass %. The ratio of the aluminum oxide component in the binding-material component is, for example, greater than or equal to 30.0 mass % and less than or equal to 75.0 mass %. Similarly, the ratio of the silicon dioxide component is, for example, greater than or equal to 28.0 mass % and less than or equal to 55.0 mass %. The ratio of the magnesium oxide component is, for example, greater than or equal to 5.0 mass % and less than or equal to 15.0 mass %. The ratio of the zirconia particles to the aggregate raw material is, for example, greater than or equal to 0.1 mass % and less than or equal to 5.0 mass %.

As will be described later, the binding material 4 containing the cordierite 41 and the zircon ($ZrSiO_4$) particles 42 is generated by firing the raw material of binding material containing a cordierite raw material and zirconia particles. If the particle diameter of the zirconia particles is excessively large, no reactions may be caused by firing or only inadequate reactions may occur, thus causing defects. Hence, the average particle diameter of the zirconia particles is preferably less than or equal to 10 μm, and more preferably less than or equal to 5 μm. From the viewpoint of workability or other factors, the average particle diameter of the zirconia particles is preferably greater than or equal to 0.4 μm, and more preferably greater than or equal to 1 μm.

Here, examples of the aluminum oxide component include not only aluminum oxides, but also aluminum and oxygen that have a composition ratio of aluminum oxide in a raw material that contains aluminum and oxygen, such as aluminum hydroxide, kaolin, boehmite, or feldspar. The mass of the aluminum oxide component refers to the mass of aluminum in terms of an oxide (mass of Al2O3) in the aluminum oxide component. When the aluminum oxide component is an aluminum oxide, the average particle diameter is preferably greater than or equal to 2.5 μm and less than or equal to 15.0 μm. The above aluminum oxide is preferably α-alumina. Examples of the silicon dioxide component include not only silicon dioxides, but also silicon and oxygen that have a composition ratio of silicon dioxide in a raw material that contains silicon and oxygen, such as talc, kaolin, or feldspar. Examples of the magnesium oxide component include not only magnesium oxides, but also magnesium and oxygen that have a composition ratio of magnesium oxide in a raw material that contains magnesium and oxygen, such as magnesium hydroxide or talc.

The raw material of binding material preferably contains, for example, Al—Si fiber, $Al_2O_3$ fiber, plate-like alumina, coarse-grained $Al_2O_3$, and kaolin as raw materials for the aluminum component (aluminum (Al) sources). The Al—Si fiber is also a raw material for the silicon component. At this time, the plate-like alumina preferably has a major axis greater than or equal to 0.5 μm. The major axis of the plate-like alumina is also preferably less than or equal to 15 μm. The minor axis (thickness) of the plate-like alumina is preferably greater than or equal to 0.01 μm. The minor axis (thickness) of the plate-like alumina is also preferably less than or equal to 1 μm. The width of the plate-like alumina is preferably greater than or equal to 0.05 μm. The width of the plate-like alumina is also preferably less than or equal to 70 μm. The aspect ratio of the plate-like alumina is preferably greater than or equal to 5. The aspect ratio of the plate-like alumina is also preferably less than or equal to 70. The alumina fiber preferably has a length less than or equal to 200 μm. The alumina fiber also preferably has a minor axis less than or equal to 3 μm. The aspect ratio of the alumina fiber is preferably greater than or equal to 3. The average particle diameter of coarse-grained $Al_2O_3$ is preferably in the range of 2.5 to 15 μm. The major and minor axes are values measured with a scanning electron microscope. More specifically, the major and minor axes are values obtained by measuring the major and minor axes of all particles in a photograph of a microstructure observed at a magnification of 3000 times and averaging each of the major and minor axes by the number of particles. The raw material for the magnesium (Mg) component (magnesium (Mg) source) is preferably MgO or $Mg(OH)_2$. The raw materials for the Si component (silicon (Si) sources) are preferably kaolin, powdered silica, and colloidal silica.

As described previously, the aggregate raw material is preferably silicon carbide (SiC) powder. The average particle diameter of the aggregate raw material is preferably greater than or equal to 5 μm, and more preferably greater than or equal to 10 μm. The average particle diameter of the aggregate raw material is also preferably less than or equal to 100 μm, and more preferably less than or equal to 40 μm.

Examples of the binder include organic binders such as methylcellulose, hydroxypropyl methylcellulose, hydroxyethylcellulose, carboxymethyl cellulose, and polyvinyl alcohol. The binder content in the whole molding raw material is preferably in the range of 2 to 10 mass %.

Examples of the surface-active agent include ethylene glycol, dextrin, fatty acid soap, and polyalcohol. Among these examples, only one kind may be used singularly, or two or more kinds may be used in combination. The content of the surface-active agent in the whole molding raw material is preferably less than or equal to 2 mass %.

There are no particular limitations on the pore forming material, as long as the pore forming material forms pores after firing, and examples of the pore forming material include graphite, starch, a foam resin, a water-absorbing resin, and silica gel. The content of the pore forming material to the whole molding raw material is preferably less than or equal to 40 mass %. The average particle diameter of the pore forming material is preferably greater than or equal to 10 μm. The average particle diameter of the pore forming material is also preferably less than or equal to 70 μm. If the average particle diameter of the pore forming material is less than 10 μm, holes may not be formed adequately. If the average particle diameter of the pore forming material is greater than 70 μm, for example when the porous material according to the present embodiment is used as a DPF or the like, part of particulate matter in exhaust gases may pass through the filter without being collected. When the pore forming material is a water-absorbing resin, the average particle diameter is a value obtained after water absorption. The water content is appropriately adjusted so as to obtain a raw mixture having easy-to-mold hardness and is preferably in the range of 20 to 80 mass % of the whole molding raw material.

Next, the molding raw material is kneaded into the raw mixture. There are not particular limitations on the method for kneading the molding raw material into the raw mixture, and examples of the method include using a device such as a kneader or a vacuum clay kneader. Thereafter, the raw mixture is subjected to extrusion molding to form a honeycomb compact (compact). Note that the raw mixture is also included in the concept of the molding raw material. The extrusion molding preferably uses a mouthpiece having desired properties such as overall shape, cell shape, partition wall thickness, and cell density. The material for the mouthpiece is preferably hard metal that is hard to wear. The honeycomb compact is structured to include porous partition walls and a tubular outer wall, the porous partition walls partitioning off and forming a plurality of cells that serve as fluid paths, and the tubular outer wall being located on the outermost perimeter. The properties of the honeycomb compact such as the thickness of the partition walls, the density of cells, and the thickness of the tubular outer wall may be appropriately determined in consideration of shrinkage during drying and firing and in accordance with the composition of a honeycomb structure to be prepared. As described above, the compact is obtained by molding the mixture of the aggregate raw material, the raw material of binding material, and the pore forming material (step S11).

The honeycomb compact is preferably dried before firing, which will be described later. There are no particular limitations on the method of drying, and examples of the method include electromagnetic-wave heating methods such as drying by microwave heating and drying by high-frequency dielectric heating, and external heating methods such as hot air drying and superheated steam drying. Among these methods, it is preferable to first use an electromagnetic-wave heating method to dry a certain amount of moisture and then use an external heating method to dry the remaining moisture, in terms of being able to rapidly and uniformly dry the whole compact without causing cracking. As drying conditions, it is preferable to use the electromagnetic-wave heating method to remove 30 to 99 mass % of moisture with respect to the amount of moisture before drying, and then use the external heating method to further reduce moisture to 3 mass % or less. A preferable electromagnetic-wave heating method is drying by dielectric heating, and a preferable external heating method is hot air drying.

If the honeycomb compact does not have a desired length in the direction of extension of the cells, it is preferable to cut the honeycomb compact to the desired length. There are no particular limitations on the method of cutting, and one example of the method is using a circular saw cutter.

Then, the compact is fired so that a porous material that is a fired compact is obtained as a honeycomb structure (step S12). Here, calcination is preferably conducted before firing, in order to remove the binder or other components. The calcination is preferably conducted at a temperature of 200 to 600° C. for 0.5 to 20 hours in the ambient atmosphere. The firing is preferably conducted in a non-oxidizing atmosphere, preferably in an inert gas atmosphere such as nitrogen or argon (with an oxygen partial pressure of $10^{-4}$ atm or less). The firing temperature is, for example, higher than or equal to 1300° C. By firing the compact, a porous material that includes aggregate particles and the binding material composed primarily of cordierite is produced. At this time, zircon particles are generated from the zirconia particles by reactions during firing. Zircon particles can also be regarded as precipitated particles precipitated by firing.

From the viewpoint of inducing adequate reactions of the zirconia particles and more reliably producing relatively large zircon particles, the firing temperature is preferably higher than or equal to 1410° C., and more preferably higher than or equal to 1430° C. The firing temperature is also, for example, lower than or equal to 1600° C., and preferably lower than or equal to 1500° C. The pressure during firing is preferably atmospheric pressure. The firing time is, for example, one hour or more and 20 hours or less.

After the firing process, the porous material is preferably subjected to heat treatment in an oxidizing atmosphere. Since the oxidation treatment forms oxide films on SiC surfaces exposed to the pores, the porous material can have excellent oxidation resistance when used as a catalyst carrier such as a DPF for purifying vehicle emission. Even if the zirconium component remains as an unreacted component in the binding material during the firing process, it is conceivable that the zirconium component reacts with an SiO2 component generated by the oxidation treatment and forms zircon. Thus, it is possible to more reliably generate the desired amount of zircon and more reliably maintain the strength of the porous material. The temperature of the oxidation treatment is, for example, higher than or equal to 1100° C. and lower than or equal to 1400° C. The oxidation treatment time is, for example, one hour or more and 20 hours or less. The calcination, firing, and oxidation treatment may be conducted using, for example, an electric furnace or a gas furnace.

Next, examples will be described. Here, porous materials (honeycomb structures) were prepared as Examples 1 to 9 and Comparative Examples 1 to 4 under the conditions shown in Table 1.

TABLE 1

| | Aggregate SiC | Binding Material | | | | | Firing Temperature (° C.) | Firing Atmosphere | Oxidation Treatment Temperature (° C.) |
| | | SiO$_2$ | Al$_2$O$_3$ | Talc | ZrO$_2$ Particle Diameter = 3 μm Specific Surface = 10 m$^2$/g | ZrO$_2$ Particle Diameter = 1 μm Specific Surface = 100 m$^2$/g | | | |
|---|---|---|---|---|---|---|---|---|---|
| Example 1 | 100.0 | 4.9 | 12.2 | 9.8 | 0.6 | 0.0 | 1450 | Ar | 1270 |
| Example 2 | | | | | 1.1 | 0.0 | 1450 | Ar | 1270 |
| Example 3 | | | | | 0.6 | 0.0 | 1430 | Ar | 1270 |
| Example 4 | | | | | 1.1 | 0.0 | 1430 | Ar | 1250 |
| Example 5 | | | | | 0.0 | 1.1 | 1430 | Ar | 1250 |
| Example 6 | | | | | 2.8 | 0.0 | 1430 | Ar | 1230 |
| Example 7 | | | | | 2.8 | 0.0 | 1450 | Ar | 1270 |
| Example 8 | | | | | 2.8 | 0.0 | 1400 | Ar | 1230 |
| Example 9 | | | | | 0.9 | 0.0 | 1430 | Ar | No Oxidation Treatment |
| Comparative Example 1 | | | | | 0.0 | 0.0 | 1450 | Ar | 1320 |
| Comparative Example 2 | | | | | 0.0 | 0.0 | 1430 | Ar | 1320 |
| Comparative Example 3 | | | | | 0.0 | 0.0 | 1400 | Ar | 1320 |
| Comparative Example 4 | 100.0 | 3.6 | 3.2 | 2.6 | 0.0 | 0.0 | 1400 | Ar | No Oxidation Treatment |

Examples 1 to 9

Assuming that the mass of silicon carbide is 100 mass %, 12.2 mass % of aluminum oxide, 9.8 mass % of talc, and 4.90 mass % of silica were mixed with silicon carbide, and 0.93 mass % of cerium oxide that serves as a sintering agent, 6.3 mass % of a water-absorbing resin and 35.0 mass % of starch that serve as pore forming materials, and 8.8 mass % of hydroxypropyl methylcellulose that serves as a binder were further mixed. Moreover, 0.6 to 2.8 mass % of zirconia particles were added to the mixture. To be more specific, either zirconia particles with an average particle diameter of 3 μm and a specific surface area of 10 m$^2$/g, or zirconia particles with an average particle diameter of 1 μm and a specific surface area of 100 m$^2$/g were mixed in the ratios shown in Table 1. Then, 70 mass % of water with respect to the mass of the inorganic raw material was added. The mixture was kneaded for 45 minutes by a kneader into a plastic raw mixture. This plastic raw mixture was molded into a cylindrical shape by a vacuum clay kneader and molded into a honeycomb shape by an extruder to obtain a compact. The compact was dried with microwaves and then with hot air (80° C., 12 hours), and then cut to the desired dimensions by cutting both ends of the compact. The resultant compact was degreased at 450° C. in the ambient atmosphere and then fired at a temperature of 1400 to 1450° C. in an inert atmosphere (argon atmosphere). Thereafter, the compact was subjected to oxidation treatment at a temperature of 1230 to 1270° C. in the air to obtain a porous material (honeycomb structure). In Example 9, the oxidation treatment was not conducted. In the porous materials of Examples 1 to 9, it was confirmed that zircon particles were generated in the binding material composed primarily of cordierite.

Comparative Examples 1 to 4

The porous materials of Comparative Examples 1 to 4 were prepared in the same manner as in Examples 1 to 9, except that zirconia particles were not added to the mixture. In Comparative Example 4, oxidation treatment was not conducted.

Various Measurements of Porous Materials

The ratio of the mass of the binding material, the ratio of the mass of the zircon particles in the binding material, the major axis of the zircon particles, the open porosity, and the bending strength were measured for the prepared porous materials. Table 2 shows the measurement results for the porous materials of Examples 1 to 9 and Comparative Examples 1 to 4. Table 2 also shows the presence or absence of oxide films on aggregate particles, the ratio of cristobalite in the porous material, and the Na content.

obtained in the photograph of a cross-section of the porous material taken at a magnification of 6000 times with a scanning electron microscope, and an average value of the maximum lengths of a plurality of zircon particles was obtained. The open porosity was measured by the Archimedes method using pure water as a medium and using a plate piece obtained by cutting the porous material to dimensions of 20 mm×20 mm×0.3 mm. In the measurement of the bending strength, the porous material (honeycomb structure) was processed into a specimen (with a height of 0.3 mm, width of 4 mm, and length of 40 mm) that was long in the direction of the penetration of the cells, and this specimen was subjected to a bending test compliant with JIS R1601.

As a method for observing the oxide films ($SiO_2$ films) on the aggregate particles, a specimen obtained by mirror-polishing a porous material contained in a resin with diamond slurry or the like was used as an observation speci-

TABLE 2

| | Ratio of Binding Material in Porous Material mass % | Ratio of Zircon Particles in Binding Material mass % | Major Axis of Zircon Particles μm | Open Porosity % | Bending Strength MPa | Presence or Absence of Oxide Films | Ratio of Cristobalite in Porous Material mass % | Na Content mass % | Angle of Rise Degree |
|---|---|---|---|---|---|---|---|---|---|
| Example 1 | 10.2 | 3.9 | 2.1 | 54.4 | 12.9 | Present | 15.7 | 0.03 | 20.1 |
| Example 2 | 11.8 | 4.2 | 2.8 | 60.9 | 12.3 | Present | 16.3 | 0.03 | — |
| Example 3 | 11.4 | 7.9 | 2.4 | 57.4 | 13.5 | Present | 16.7 | 0.03 | 22.6 |
| Example 4 | 12.2 | 9.0 | 3.4 | 60.0 | 14.4 | Present | 15.6 | 0.03 | — |
| Example 5 | 13.7 | 12.4 | 2.2 | 55.0 | 16.4 | Present | 15.8 | 0.03 | — |
| Example 6 | 13.5 | 25.9 | 3.0 | 59.0 | 18.3 | Present | 17.2 | 0.03 | 18.8 |
| Example 7 | 14.0 | 25.0 | 4.4 | 59.4 | 18.6 | Present | 15.3 | 0.03 | — |
| Example 8 | 9.5 | 33.7 | 1.5 | 63.7 | 7.8 | Present | 11.2 | 0.03 | — |
| Example 9 | 14.6 | 8.9 | 1.4 | 57.2 | 9.8 | Absent | Undetected | 0.03 | — |
| Comparative Example 1 | 12.9 | 0.0 | | 61.1 | 7.0 | Present | 16.8 | 0.03 | 28.1 |
| Comparative Example 2 | 10.1 | 0.0 | | 61.0 | 6.9 | Present | 15.4 | 0.03 | 27.2 |
| Comparative Example 3 | 13.4 | 0.0 | | 66.2 | 5.1 | Present | 10.8 | 0.03 | — |
| Comparative Example 4 | 5.4 | 0.0 | | 67.2 | Unmeasurable | Absent | Undetected | 0.04 | — |

The ratio of the mass of each constituent crystalline phase (e.g., SiC and cristobalite in aggregate particles, cordierite, and zircon particles) in the porous material was obtained as follows. An X-ray diffraction pattern of the porous material was obtained using an X-ray diffractometer. As the X-ray diffractometer, a rotating anticathode X-ray diffractometer (RINT manufactured by Rigaku corporation) was used. The conditions of the X-ray diffraction measurement were as follows: a CuKα-ray source, 50 kV, 300 mA, and 2θ=10 to 600. Then, the ratio of the mass of each constituent crystalline phase was calculated by simplified quantitative analysis, in which each component was determined quantitatively through analysis of obtained X-ray diffraction data using a reference intensity ratio (RIR) method. The analysis of the X-ray diffraction data was conducted using, for example, Jade 7 software, which was X-ray data analysis software produced by MDI. In Table 2, the ratio of the mass of the binding material to the total mass of the aggregate particles and the binding material is shown as "Ratio of Binding Material in Porous Material," and the ratio of the mass of the zircon particles to the mass of the binding material is shown as "Ratio of Zircon Particles in Binding Material." The ratio of the mass of cristobalite to the above total mass is shown as "Ratio of Cristobalite in Porous Material."

In the measurement of the major axis of the zircon particles, a maximum length of each zircon particle was men, and a cross-sectional polished surface of this specimen was examined at a magnification of 1500 times to observe oxide films around SiC. In Table 2, examples for which the presence of the oxide films was confirmed under the aforementioned observation conditions are shown as "Present," and examples for which the presence of the oxide films was not confirmed are shown as "Absent." In the porous materials of Examples 1 to 8 and Comparative Examples 1 to 3 that had undergone the oxidation treatment, the presence of the oxide films was confirmed and cristobalite was detected, whereas in the porous materials of Example 9 and Comparative Example 4 that had not undergone the oxidation treatment, neither the presence of the oxide films was confirmed nor cristobalite was detected. Thus, it can be said that the oxide films are cristobalite. In the determination of the Na content, the Na content in the porous material (the ratio of the mass of Na to the mass of the whole porous material) was analyzed by inductively coupled plasma atomic emission spectroscopy (ICP-AES). In all of the porous materials of Examples 1 to 9 and Comparative Examples 1 to 4, the Na content was less than 0.1 mass %.

Figure 7:
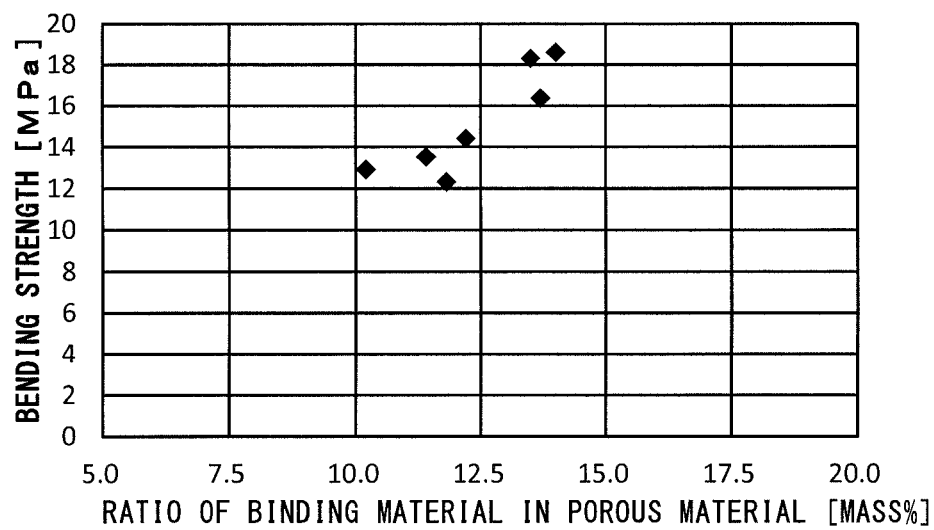
FIG. 7 illustrates a relationship between the ratio of a binding material in the porous material and bending strength.

Table 2 shows that the porous materials of Examples 1 to 9 and the porous materials of Comparative Examples 1 to 4 all have open porosities higher than or equal to 50%, i.e., all have high porosities. It is also found that the porous materials of Examples 1 to 9 that contained zircon particles in the binding material had higher bending strength than the porous materials of Comparative Examples 1 to 4 that did not contain zircon particles in the binding material. In all of the porous materials of Examples 1 to 9, the ratio of the binding material in the porous material was greater than or equal to 8 mass %. FIG. 7 illustrates a relationship between the ratio of the binding material and the bending strength for the porous materials of Examples 1 to 7. It can be seen from FIG. 7 that the bending strength increases as the ratio of the binding material in the porous material increases. FIG. 7 omits illustration of Examples 8 and 9 in which the major axis of the zircon particles was less than 2.0 μm (the same applies to FIG. 8, which will be described later).

Figure 8:
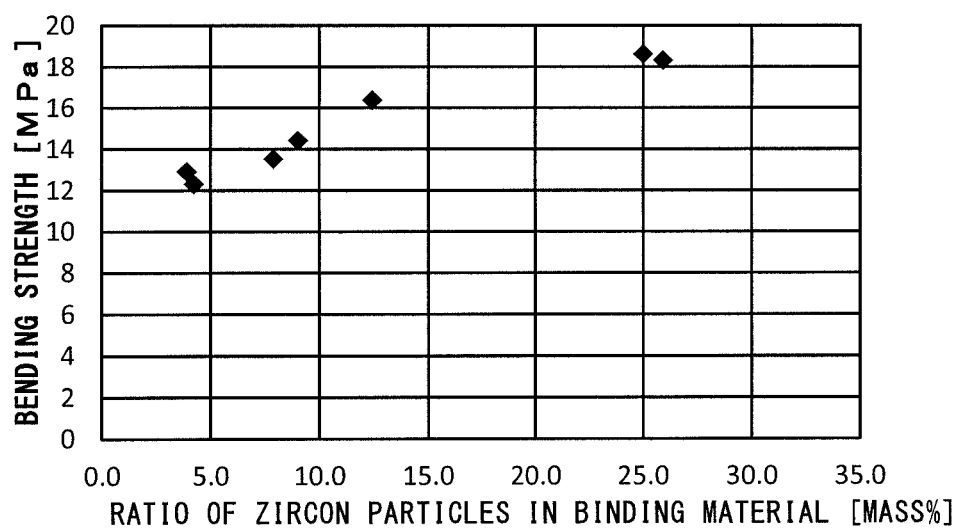
FIG. 8 illustrates a relationship between the ratio of zircon particles in the binding material and the bending strength.

FIG. 8 illustrates a relationship between the ratio of the zircon particles in the binding material and the bending strength for the porous materials of Examples 1 to 7. It can be seen from FIG. 8 that the bending strength increases as the ratio of the zircon particles in the binding material increases. Here, the ratio of the zircon particles in the binding material was greater than or equal to 1 mass % in all cases. Thus, the porous materials have adequate bending strength. The bending strength of the porous material is more reliably increased if the ratio of the zircon particles in the binding material is greater than or equal to 3 mass %, and yet more reliably increased if the ratio of the zircon particles in the binding material is greater than or equal to 5 mass %.

Figure 9:
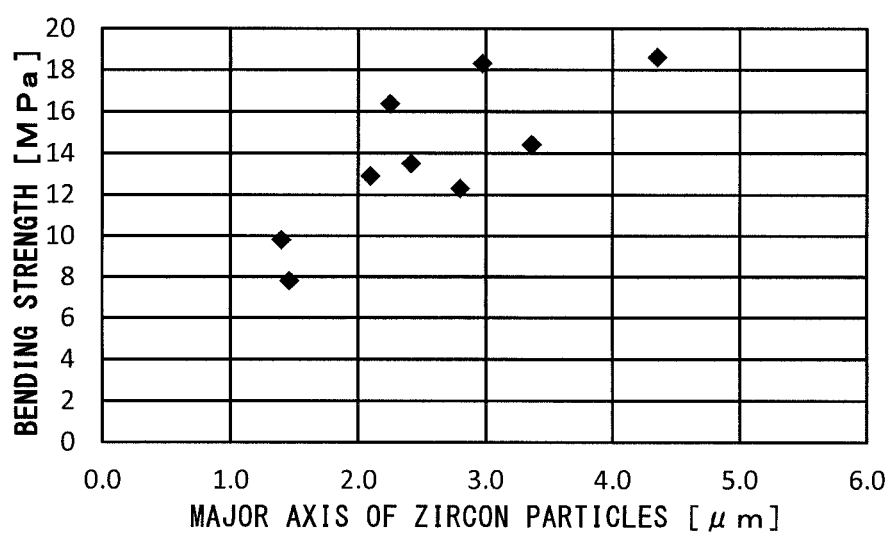
FIG. 9 illustrates a relationship between the major axis of the zircon particles and the bending strength.

FIG. 9 illustrates a relationship between the major axis of the zircon particles and the bending strength for the porous materials of Examples 1 to 9. It can be seen from FIG. 9 that the bending strength increases as the major axis of the zircon particles increases. Here, the porous materials had adequate bending strength (12.0 MPa or more) because the major axis of the zircon particles was greater than or equal to 2.0 μm. It can be said from Tables 1 and 2 that the porous materials that contain zircon particles having major axes of 2.0 μm or more are easily obtained if the firing temperature is higher than or equal to 1430° C. The bending strength of the porous materials is further increased if the major axis of the zircon particles is greater than or equal to 2.5 μm, and yet further increased if the major axis of the zircon particles is greater than or equal to 3.0 μm.

In Table 2, the representative value for the angle of rise on the edge of the binding material is also shown in the "Angle of Rise" column for the porous materials of Examples 1, 3, and 6 and Comparative Examples 1 and 2. The angle of rise on the edge of the binding material was obtained by the technique described with reference to FIG. 5. Here, 10 measurement positions were specified in an image obtained by photographing a cross-sectional polished surface at a magnification of 1500 times, and an average value of the 10 angles of rise was obtained. In the porous materials of Examples 1, 3, and 6 that contained zircon particles in the binding material, the representative value for the angle of rise was less than or equal to 25 degrees. In these porous materials, the binding material contained 3.9 to 25.9 mass % of zircon particles with respect to the whole binding material. In contrast, in the porous materials of Comparative examples 1 and 2 that did not contain zircon particles in the binding material, the representative value for the angle of rise was greater than 25 degrees.

The porous material 2 and the honeycomb structure 1 described above may be modified in various ways.

The porous material 2 may be formed in a form other than the honeycomb structure 1, and may be used in various applications other than filters. Depending on the application of the porous material 2, the aggregate particles 3 may contain particles of a plurality of types of substances.

The method of producing the porous material 2 and the honeycomb structure 1 is not intended to be limited to the examples described above, and may be modified in various ways. For example, a porous material that includes a binding material containing cordierite and zircon particles may be produced by including zircon particles in advance in the raw material of binding material.

The configurations of the preferred embodiments and variations described above may be appropriately combined as long as there are no mutual inconsistencies.

While the invention has been shown and described in detail, the foregoing description is in all aspects illustrative and not restrictive. It is therefore to be understood that numerous modifications and variations can be devised without departing from the scope of the invention. This application claims priority benefit under 35 U.S.C. Section 119 of Japanese Patent Application No. 2016-208153 filed in the Japan Patent Office on Oct. 24, 2016, Japanese Patent Application No. 2017-058751 filed in the Japan Patent Office on Mar. 24, 2017, and Japanese Patent Application No. 2017-172070 filed in the Japan Patent Office on Sep. 7, 2017, the entire disclosures of which are incorporated herein by reference.

REFERENCE SIGNS LIST

1 Honeycomb structure
2 Porous material
3 Aggregate particles
4 Binding material
41 Cordierite
42 Zircon particles
112 Partition wall
113 Cell
S11, S12 Step

The invention claimed is:
1. A porous material comprising:
aggregate particles including particle bodies; and
a binding material that contains cordierite and zircon particles and binds said aggregate particles together in a state where pores are formed,
wherein an oxide film is provided on or around surfaces of the particle bodies, and
wherein a major axis of said zircon particles is greater than or equal to 2.0 μm.
2. The porous material according to claim 1, wherein a ratio of a mass of said binding material to a total mass of said aggregate particles and said binding material is greater than or equal to 8 mass % and less than or equal to 40 mass %.
3. The porous material according to claim 1, wherein a ratio of a mass of said zircon particles to a mass of said binding material is greater than or equal to 1 mass % and less than or equal to 50 mass %.
4. The porous material according to claim 1, wherein a porosity is higher than or equal to 50% and lower than or equal to 70%.
5. The porous material according to claim 1, wherein a bending strength is greater than or equal to 7.5 MPa.
6. The porous material according to claim 1, wherein a ratio of a mass of sodium to a mass of said porous material as a whole is less than 0.1 mass %.
7. The porous material according to claim 1, wherein a representative value for an angle at which an edge of said binding material in a cross-section of said porous material rises with respect to a direction tangent to the edge at a position at which curvature is locally a maximum is greater than 0 degrees and less than or equal to 25 degrees.

8. The method of producing the porous material according to claim 1, wherein a ratio of a mass of said binding material to a total mass of said aggregate particles in said binding material is less than or equal to 20 mass %.

9. A honeycomb structure that is a tubular member made of the porous material according to claim 1 and having an interior partitioned into a plurality of cells by partition walls.

* * * * *